US009840986B2

(12) United States Patent
Onodera et al.

(10) Patent No.: US 9,840,986 B2
(45) Date of Patent: Dec. 12, 2017

(54) TWO-STAGE CHANGEOVER VALVE

(71) Applicant: DENSO CORPORATION, Kariya, Aichi-pref. (JP)

(72) Inventors: Hirofumi Onodera, Kariya (JP); Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 14/861,277

(22) Filed: Sep. 22, 2015

(65) Prior Publication Data
US 2016/0090945 A1    Mar. 31, 2016

(30) Foreign Application Priority Data

Sep. 25, 2014    (JP) .................................. 2014-195855

(51) Int. Cl.
*F02M 25/08*    (2006.01)
*F16K 1/32*    (2006.01)
(Continued)

(52) U.S. Cl.
CPC ......... *F02M 25/0836* (2013.01); *F16K 1/526* (2013.01); *F16K 1/54* (2013.01);
(Continued)

(58) Field of Classification Search
CPC ............. F02M 25/0836; F02M 25/089; F02M 2025/0845; G05D 7/01; B60K 15/03504;
(Continued)

(56) References Cited

U.S. PATENT DOCUMENTS 3,080,885 A * 3/1963 Webster ................ F16K 31/363
137/471
5,188,141 A * 2/1993 Cook ..................... B60T 13/52
123/520
(Continued)

FOREIGN PATENT DOCUMENTS

JP    2004-156496    6/2004
JP    2012-97661    5/2012

OTHER PUBLICATIONS

Uchida, et al., U.S. Appl. No. 14/994,215, filed Jan. 13, 2016.
U.S. Appl. No. 14/713,200, filed May 15, 2015, Harada et al.

*Primary Examiner* — Stephen K Cronin
*Assistant Examiner* — John Bailey
(74) *Attorney, Agent, or Firm* — Nixon & Vanderhye P.C.

(57) ABSTRACT

A two-stage changeover valve is provided in a vaporized fuel passage connected between a fuel tank and a canister. A valve member is movably accommodated in a fluid passage formed in a valve housing. A valve seat is formed at an inner peripheral wall of the valve housing, so that the valve member is operatively seated on the valve seat. A restricted communication hole is formed in the valve member, so that an upstream side and a downstream side of the valve member are communicated with each other, even when the valve member is seated on the valve seat. The restricted communication hole is formed in a Laval-nozzle shape, so that vaporized fuel passing through the restricted communication hole is accelerated. As a result, a process for depressurizing inner pressure of the vaporized fuel in the fuel tank can be carried out in a shorter time.

7 Claims, 4 Drawing Sheets

(51) Int. Cl.
  *F16K 1/52* (2006.01)
  *F16K 1/54* (2006.01)
  *F16K 31/06* (2006.01)

(52) U.S. Cl.
  CPC ...... *F16K 31/0655* (2013.01); *F16K 31/0686* (2013.01); *F02M 25/089* (2013.01); *F02M 2025/0845* (2013.01)

(58) Field of Classification Search
  CPC ... F16K 1/32; F16K 1/526; F16K 1/54; F16K 31/0655; F16K 31/0686
  USPC ........ 123/516, 519, 520, 521, 458; 137/493, 137/493.9, 495, 315.03, 487.5; 251/121, 251/122, 123, 205, 206, 207, 129.14, 251/129.15, 129.07, 30.01–30.04, 118, 251/120
  See application file for complete search history.

(56) References Cited

U.S. PATENT DOCUMENTS

| | | | | |
|---|---|---|---|---|
| 5,460,137 | A * | 10/1995 | Zabeck | F02M 25/0809 123/516 |
| 5,630,403 | A * | 5/1997 | Van Kampen | F02M 25/0836 123/520 |
| 5,967,164 | A * | 10/1999 | Denda | F16K 1/38 137/1 |
| 6,149,126 | A * | 11/2000 | Krimmer | F02M 25/0836 123/516 |
| 6,253,789 | B1 * | 7/2001 | Krimmer | F02M 25/0836 123/516 |
| 6,415,817 | B1 * | 7/2002 | Krimmer | F02M 25/0836 137/550 |
| 7,219,690 | B2 * | 5/2007 | McDonald | F16K 17/30 137/512.1 |
| 7,770,598 | B2 * | 8/2010 | Bittner | F16K 31/0655 137/630.15 |
| 9,696,732 | B2 * | 7/2017 | Harada | G05D 16/106 |
| 2003/0089344 | A1 * | 5/2003 | Rodriguez | F02M 25/0836 123/520 |
| 2004/0255916 | A1 * | 12/2004 | Ivens | F02M 25/0836 123/520 |
| 2005/0051142 | A1 * | 3/2005 | Zdravkovic | F02M 25/0809 123/520 |
| 2005/0217734 | A1 | 10/2005 | Takakura | |
| 2012/0318242 | A1 * | 12/2012 | Roh | F16K 27/029 123/520 |

\* cited by examiner

FIG. 2A
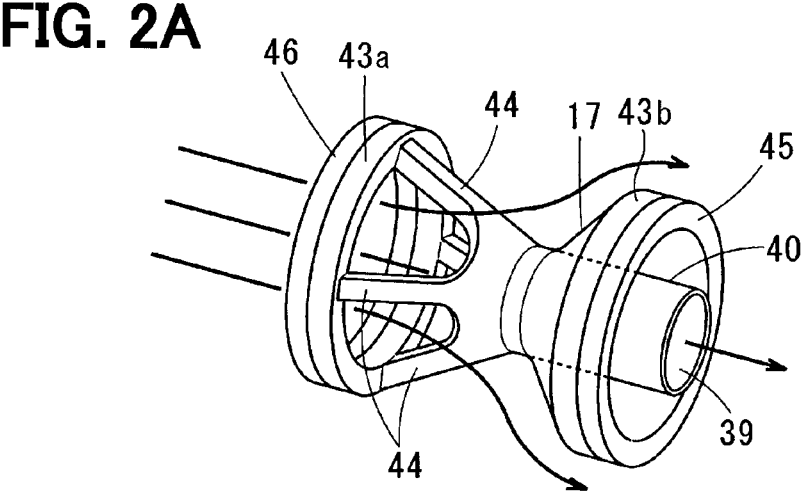
FIG. 2B
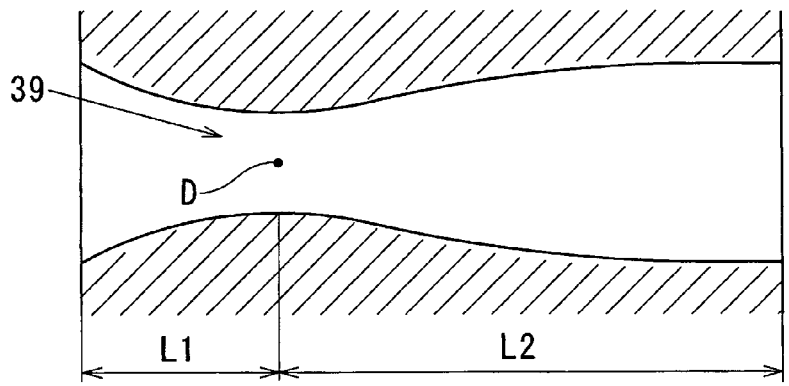
FIG. 3
| E-VALVE | ON | ON |
|---|---|---|
| C-VALVE | CLOSED (UPSTREAM:HIGH) | OPENED (UPSTREAM:LOW) |
| VALVE MOVEMENT | | |
E-VALVE=ELECTROMAGNETIC VALVE
C-VALVE=CHANGEOVER VALVE

TWO-STAGE CHANGEOVER VALVE

CROSS REFERENCE TO RELATED APPLICATION

This application is based on Japanese Patent Application No. 2014-195855 filed on Sep. 25, 2014, the disclosure of which is incorporated herein by reference.

FIELD OF TECHNOLOGY

The present disclosure relates to a two-stage changeover valve, according to which fluid flows through a restricted passage formed in a valve member even when the valve member is in its closed condition.

BACKGROUND

A two-stage changeover valve of a pressure-operated type is known in the art, for example, as disclosed in Japanese Patent Publication No. 2005-291241, according to which a flow passage area is switched over by fluid pressure and fluid flows through a restricted passage formed in a valve member when the valve member is in its closed condition.

The two-stage changeover valve of this kind is composed of the valve member movably accommodated in a fluid passage and a spring for biasing the valve member in an upstream direction of the fluid passage.

When the fluid pressure in the fluid passage at an upstream side of the valve member is increased and a pressure force (a pressure receiving load) received by the valve member is thereby increased, the valve member is moved in a downstream direction against a biasing force of the spring so as to reduce a fluid passage area. More exactly, when the valve member is moved in the downstream direction to its valve closed position, the valve member closes the fluid passage (a valve closed condition), while the fluid flow in the downstream direction is allowed through a restricted passage formed in the valve member even in the valve closed condition.

On the other hand, when the fluid pressure of the upstream side of the fluid passage is decreased and thereby the pressure force received by the valve member is decreased, the valve member is moved in an upstream direction by the biasing force of the spring so as to increase the fluid passage area. More exactly, when the valve member is moved in the upstream direction, the valve closed condition of the fluid passage by the valve member is released (a valve opened condition).

Accordingly, as a result that the valve member is moved to switch over the fluid flow area, the fluid pressure is adjusted or a flow amount of the fluid is controlled.

In some cases, the fluid is required to quickly flow through the fluid passage, in which the two-stage changeover valve is provided.

However, as explained above, the fluid passage is closed by the valve member and the fluid is allowed to flow only through the restricted passage formed in the valve member, when the fluid pressure at the upstream side of the two-stage changeover valve is high. As a result, the fluid cannot quickly pass through the two-stage changeover valve, when the fluid pressure at the upstream side of the two-stage changeover valve is high.

It could be possible to enlarge the restricted passage so as to increase a flow rate of the fluid in a condition that the two-stage changeover valve is closed.

However, if an inner diameter of the restricted passage is increased, there might occur other troubles, for example, a changeover pressure for the valve member is changed, a flow rate of the fluid (a maximum flow rate of the enlarged restricted passage) exceeds an upper limit when the fluid pressure in the upstream side is high, and so on.

For example, in a case that the two-stage changeover valve is provided in a fluid passage for depressurizing inner pressure of a fuel tank, it is required that a larger amount of the fluid (vaporized fuel) flows through the two-stage changeover valve during a process of depressurizing the inner pressure of the fuel tank.

However, as explained above, a larger amount of the fluid (the vaporized fuel) cannot quickly flow through the two-stage changeover valve when the inner pressure of the fuel tank is high (namely, when the fluid pressure at the upstream side is high), because the two-stage changeover valve is moved to its valve closed position and the vaporized fuel is allowed to flow only through the restricted passage formed in the valve member. As a result, a longer time period is necessary for depressurizing the inner pressure of the fuel tank.

An example for depressurizing the inner pressure of the fuel tank will be further explained.

A device is provided in a vehicle for preventing the vaporized fuel from being discharged into the atmosphere when a filler cap is opened in order to fill gasoline into the fuel tank.

When a vehicle driver turns on a lid switch for the purpose of filling the gasoline into the fuel tank, a vaporized fuel passage connecting the fuel tank to a canister is opened so that the vaporized fuel flows from the fuel tank into the canister. In other words, inner pressure of the vaporized fuel in the fuel tank is thereby depressurized.

A lid lock device provided in the vehicle prevents a fuel lid, which is a door for covering the filler cap, from being opened by a spring force. When the inner pressure of the fuel tank is decreased to a predetermined pressure by the above process of depressurizing the inner pressure, the lid lock device is released so as to open the fuel lid.

The two-stage changeover valve, for example, as disclosed in the above prior art (JP No. 2005-291241), is provided in the vaporized fuel passage.

When the inner pressure of the vaporized fuel in the fuel tank is high during the process of depressurizing the fuel tank, the vaporized fuel of a larger amount cannot quickly flow into the canister through the two-stage changeover valve. Therefore, it is a problem that a longer time period is necessary for depressurizing the fuel tank before filling the gasoline into the fuel tank.

SUMMARY OF THE DISCLOSURE

The present disclosure is made in view of the above problem. It is an object of the present disclosure to provide a two-stage changeover valve, according to which a fluid flow rate through a restricted passage formed in a valve member can be increased even in a valve closed condition without increasing an opening area of the restricted passage.

According to a feature of the present disclosure, a restricted communication hole is formed in a valve member of a two-stage changeover valve and the restricted communication hole is formed in a Laval-nozzle shape.

According to the above feature, it is possible that fluid at an upstream side of the valve member is accelerated by the Laval-nozzle shape and the fluid flows in a downstream direction (for example, to a canister of a vehicle).

In other words, it is possible that larger amount of the fluid can flow through the restricted communication hole without enlarging an inner diameter of the restricted communication hole, even when the two-stage changeover valve is in its valve closed condition.

When the two-stage changeover valve is provided in a fluid passage for depressurizing inner pressure of a tank, a process for depressurizing the inner pressure of the tank can be carried out in a shorter time, even when the inner pressure of the tank is high at a start of a depressurizing process.

More exactly, when the two-stage changeover valve is provided in a vaporized fuel passage connecting a fuel tank and a canister with each other, a process for depressurizing inner pressure of vaporized fuel in the fuel tank can be carried out in a shorter time, even when the inner pressure of the vaporized fuel in the fuel tank is high at the start of the depressurizing process and thereby the two-stage changeover valve is in its valve closed condition.

BRIEF DESCRIPTION OF THE DRAWINGS

The above and other objects, features and advantages of the present disclosure will become more apparent from the following detailed description made with reference to the accompanying drawings. In the drawings:

FIG. 2A is a schematic perspective view showing a valve member of the two-stage changeover valve;

FIG. 2B is a view for explaining a shape of a Laval nozzle (a convergent-divergent nozzle);

FIG. 3 is a view for explaining an operation of the two-stage changeover valve, wherein a left-hand portion shows a valve closed condition, while a right-hand portion shows a valve opened condition;

DETAILED DESCRIPTION OF THE EMBODIMENTS

The present disclosure will be explained hereinafter by way of an embodiment with reference to the drawings.

The present disclosure is not limited to the embodiment explained hereinafter with reference to the drawings.

A fuel purging apparatus for vaporized fuel will be explained with reference to FIGS. 1 to 6.

Figure 6:
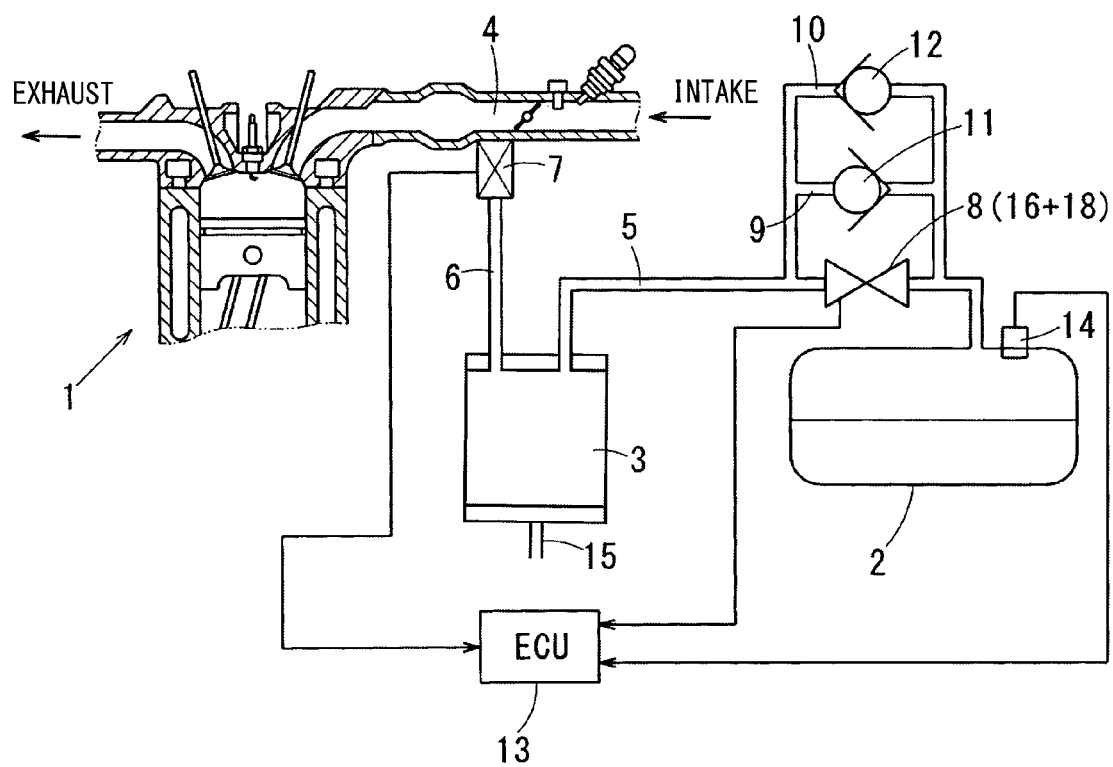
FIG. 6 is a view showing an outline of a structure for a fuel purging apparatus for a vehicle.

The fuel purging apparatus for the vaporized fuel, which is shown in FIG. 6, is installed in a vehicle having an internal combustion engine 1 (hereinafter, the engine 1). The vaporized fuel in a fuel tank 2 is adsorbed in a canister 3 and such adsorbed fuel in the canister 3 is desorbed and introduced into an intake-air passage 4 during an operation of the engine 1, so as to carry out a fuel purging process.

The fuel purging apparatus is composed of the following parts and/or components (but not limited thereto);

(a) a vaporized fuel passage 5 for introducing the vaporized fuel generated in the fuel tank 2 into the canister 3;

(b) a purge passage 6 for introducing the vaporized fuel absorbed in the canister 3 into a negative-pressure portion of the intake-air passage 4 (that is, a portion of the intake-air passage at a downstream side of a throttle valve);

(c) a purge valve 7 provided in the purge passage 6 for controlling an opening degree of the purge passage 6;

(d) a closed-type valve device 8 provided in the vaporized fuel passage 5, that is, a valve device 8 in which an electromagnetic valve 16 and a two-stage changeover valve 18 are integrally formed, as explained below;

(e) two bypass passages (a first bypass passage 9 and a second bypass passage 10) bypassing at least the electromagnetic valve 16;

(f) a positive-pressure relief valve 11 provided in the first bypass passage 9; and (g) a negative-pressure relief valve 12 provided in the second bypass passage 10.

Multiple electrical functional components provided in the fuel purging apparatus are controlled by an electronic control unit 13 for the engine (hereinafter, the ECU 13).

The fuel tank 2 stores therein liquid fuel, for example, gasoline. An upper-side space thereof is filled with the vaporized fuel. A pressure sensor 14 is provided in the fuel tank 2 for detecting inside pressure of the upper-side space (also referred to as an in-tank pressure). A detected signal (a sensor value for the in-tank pressure) is outputted to the ECU 13.

The canister 3 is a container for accommodating absorbing material (for example, activated carbon), which absorbs the vaporized fuel and holds it therein. The canister 3 is connected to the upper-side space of the fuel tank 2 via the vaporized fuel passage 5 and further connected to the negative-pressure portion of the intake-air passage 4 via the purge passage 6.

The canister 3 is communicated to the atmosphere via an air inlet passage 15, so that air can be introduced from the outside into the canister 3. A CCV (a canister control valve: not shown) having an electromagnetic valve is provided in the air inlet passage 15. The CCV is controlled by the ECU 13, so that the air is introduced into the canister 3 when the CCV is opened.

The purge valve 7 is composed of an electromagnetic valve of a normally-closed type, which is opened when electric power is supplied to the electromagnetic valve. The purge valve 7, which has a well-known structure, is controlled by the ECU 13. When the engine operation is stopped, the electric power supply to the purge valve 7 is stopped so that the purge valve 7 is closed. During the engine operation (for example, during a predetermined period from starting the engine operation, during a period when a predetermined operational condition is satisfied (for example, when a negative pressure is produced for an intake-air), or during a whole period of the engine operation), the electric power supply to the purge valve 7 is continued, for example, the power supply is controlled by a duty-ratio control, in order that a purge amount of the vaporized fuel to be introduced into the intake-air passage 4 is adjusted.

The ECU 13 controls the operation of the engine 1, for example, controls electric power supply to multiple fuel injectors so as to control fuel injection by those fuel injectors. More exactly, the ECU 13 not only controls an opening degree of the purge valve 7 during the operation of the engine 1 in order to adjust the purge amount of the vaporized fuel to be introduced into the intake-air passage 4, but also calculates a fuel-injection correction amount based on the purge amount. The ECU 13 corrects a fuel injection amount to be injected from the fuel injectors based on the above calculated fuel-injection correction amount, so that an air-fuel ratio is maintained at a target air-fuel ratio, which is properly fit to an operating condition of the engine 1. Since a method for controlling the opening degree of the purge valve 7 as well as a method for correcting the fuel injection amount based on the vaporized fuel is known in the art, explanation thereof is omitted here.

Each of the first and the second bypass passages 9 and 10 connects an upstream side and a downstream side of the closed-type valve device 8 (more exactly, the electromagnetic valve 16, as explained below) to each other. In other words, the upstream side (a side of the fuel tank 2) and the downstream side (a side of the canister 3) are connected to each other by the first and the second bypass passages 9 and 10. The closed-type valve device 8 may be integrally formed with the bypass passages 9 and 10 or separately formed from the bypass passages 9 and 10.

The positive-pressure relief valve 11 is composed of a check valve, which is opened when the in-tank pressure of the fuel tank 2 becomes higher than a predetermined upper-limit value. For example, the positive-pressure relief valve 11 has a reed-valve structure using a diaphragm, a check-valve structure using a ball valve, or the like.

On the other hand, the negative-pressure relief valve 12 is composed of a check valve, which is opened when the in-tank pressure of the fuel tank 2 becomes lower than a predetermined lower-limit value. In a similar manner to the positive-pressure relief valve 11, the negative-pressure relief valve 12 has the reed-valve structure using the diaphragm, the check-valve structure using the ball valve or the like.

Since the positive-pressure and the negative-pressure relief valves 11 and 12, which are mechanically opened or closed depending on the in-tank pressure of the fuel tank 2, are provided as above, it is possible to maintain the in-tank pressure of the fuel tank 2 within a predetermined pressure range even when the temperature surrounding the fuel tank 2 is changed. It is, therefore, not necessary to increase strength of the fuel tank 2 more than needs. It is possible to prevent any defects, for example, a crack of the fuel tank 2. As a result, it becomes possible to reduce a cost and a weight of the fuel tank 2.

The closed-type valve device 8 is composed of the electromagnetic valve 16 for opening and/or closing the vaporized fuel passage 5 and the two-stage changeover valve 18 having a valve member 17, which is movably accommodated in the vaporized fuel passage 5 and linearly moves for changing a passage area of the vaporized fuel passage 5. The electromagnetic valve 16 and the two-stage changeover valve 18 are, for example, integrally formed and co-axially arranged with each other.

The electromagnetic valve 16 is a normally-closed type valve (the N/C type valve) for closing the fuel tank 2 when the electromagnetic valve 16 is closed and opening the fuel tank 2 when electric power is supplied thereto.

The electromagnetic valve 16 is composed of a valve unit 20 for opening and closing an L-letter shaped passage 19 (a part of the vaporized fuel passage 5), an electromagnetic actuator 21 for driving the valve unit 20 in a valve opening direction (in a left-hand direction in FIG. 1) by a magnetic attracting force generated by the supply of the electric power, a return spring 23 for biasing an armature 22 of the electromagnetic actuator 21 as well as the valve unit 20 in a valve closing direction (in a right-hand direction in FIG. 1) and so on.

Since a structure of the electromagnetic actuator 21 including the return spring 23 is known in the art, explanation therefor is omitted here.

A structure of the valve unit 20 of the closed-type valve device 8 as well as a structure of the L-letter shaped passage 19 is not limited to the structures shown in the drawing. However, an example of the structures for the valve unit 20 and the L-letter shaped passage 19 will be explained, because the structures for the valve unit 20 and the L-letter shaped passage 19 are related to the two-stage changeover valve 18 integrally formed with the electromagnetic valve 16.

The valve unit 20, which is axially moved by the armature 22 and the return spring 23 of the electromagnetic actuator 21, is formed in a cylindrical shape.

The L-letter shaped passage 19, which is connected to a resin housing 24 of the electromagnetic actuator 21, has an inlet pipe 25 to be connected to a delivery pipe on a side of the fuel tank 2 and an outlet pipe 26 to be connected to another delivery pipe on a side of the canister 3. The major components of the electromagnetic valve 16 (such as, the armature 22) as well as the two-stage changeover valve 18 are co-axially arranged with the outlet pipe 26.

More exactly, a valve accommodating pipe portion 27 is formed in the L-letter shaped passage 19. The valve accommodating pipe portion 27 is co-axially arranged with the outlet pipe 26 and accommodates therein the valve unit 20 and the two-stage changeover valve 18. The inlet pipe 25 is formed at a side wall of the valve accommodating pipe portion 27.

A direction, in which the valve accommodating pipe portion 27 co-axially extends with the electromagnetic actuator 21, is referred to as an axial direction. A left-hand side in the drawing (FIG. 1) is referred to as an upstream side, while a right-hand side is referred to as a downstream side. The valve accommodating pipe portion 27 is also referred to as a valve housing 27.

A cylindrical member 28 is inserted into an inside of the valve accommodating pipe portion 27 (the valve housing 27). An annular flange 29 formed at one axial end of the cylindrical member 28 is interposed between the resin housing 24 of the electromagnetic actuator 21 and an axial end of the valve housing 27. A pair of O-rings 30 is provided at an outer peripheral surface of the cylindrical member 28 in order to seal respective gaps between the valve housing 27 and the cylindrical member 28. An outer periphery of a diaphragm 31 made of rubber is arranged between the resin housing 24 of the electromagnetic actuator 21 and the cylindrical member 28. The diaphragm 31 is a partitioning member of a ring shape for preventing the vaporized fuel introduced into the L-letter shaped passage 19 from passing into the electromagnetic actuator 21. An inner periphery of the diaphragm 31 is located between the valve unit 20 and the armature 22 so that the inner periphery thereof is held between them.

An opening port 32 is formed at a cylindrical side wall of the cylindrical member 28, so that the vaporized fuel from the inlet pipe 25 is introduced into an inside of the cylindrical member 28.

A valve seat 33 is formed in the cylindrical member 28 on a side to the outlet pipe 26, so that the valve unit 20 is operatively seated on the valve seat 33. The two-stage changeover valve 18 has two guide wall surfaces, that is, an upstream-side guide wall surface 34 and a downstream-side guide wall surface 35. The upstream-side guide wall surface 34 is formed at an inner peripheral wall of the cylindrical member 28 on the side to the outlet pipe 26.

A through-hole extending in the axial direction is formed at a center of the valve seat 33 and the through-hole is opened or closed by the valve unit 20. More exactly, when the power supply to the electromagnetic valve 16 is cut off, the valve unit 20 is seated on the valve seat 33 so as to close the through-hole, namely, to close the vaporized fuel passage 5. On the other hand, when the electric power is supplied to the electromagnetic valve 16, the valve unit 20 is separated from the valve seat 33 so as to open the through-hole (the vaporized fuel passage 5).

The two-stage changeover valve 18, which is a valve of a pressure-responsive type for changing a passage area depending on a fluid pressure (that is, a pressure of the vaporized fuel from the fuel tank 2), is composed of the valve member 17 and a spring member 36. The valve member 17 has outer peripheral portions, that is, an upstream-side outer peripheral portion 43a and a downstream-side outer peripheral portion 43b, so that each of the outer peripheral portions 43a and 43b is movably supported by the upstream-side and the downstream-side guide wall surfaces 34 and 35, respectively. In other words, the valve member 17 is movable in a fluid passage (a part of the vaporized fuel passage 5) in its axial direction and receives the pressure of the vaporized fuel introduced at the upstream side of the two-stage changeover valve 18. The spring member 36 biases the valve member 17 in a direction to the upstream side of the two-stage changeover valve 18.

The spring member 36, which is composed of a compression coil spring formed in a conical shape, is located between the valve member 17 and a spring seat 37 formed at an inner wall of the L-letter shaped passage 19 (more exactly, the valve housing 27). The spring member 36 is assembled in a compressed condition.

When the fluid pressure (the pressure of the vaporized fuel from the fuel tank 2) in the upstream side of the two-stage changeover valve 18 is increased and the pressure received by the valve member 17 is thereby increased, the valve member 17 is moved in the downstream direction against the biasing force of the spring member 36. As a result, the passage area of the fluid passage formed in the valve housing 27 (i.e., the vaporized fuel passage 5) is reduced. More exactly, as shown in FIG. 3 (in a left-hand portion of FIG. 3), the valve member 17 is moved in the downstream direction (in a direction toward the outlet pipe 26) and the downstream-side outer peripheral portion 43b of the valve member 17 is brought into contact with a valve seat 38 of a ring shape formed at the inner wall of the L-letter shaped passage 19. Then, the fluid (the vaporized fuel) is not allowed to go around the valve member 17. In other words, the fluid is allowed to flow in the downstream direction only through a restricted communication hole 39 formed in the valve member 17. The above condition of the two-stage changeover valve 18 (that is, the condition shown in the left-hand portion of FIG. 3) is referred to as a valve closed condition of the two-stage changeover valve 18.

On the other hand, when the fluid pressure (the pressure of the vaporized fuel from the fuel tank 2) in the upstream side of the two-stage changeover valve 18 is decreased and the pressure received by the valve member 17 is thereby decreased, the valve member 17 is moved in an upstream direction (in a direction toward the electromagnetic actuator 21) by the biasing force of the spring member 36. As a result, the passage area of the fluid passage formed in the valve housing 27 (the vaporized fuel passage 5) is increased. More exactly, as shown in FIG. 3 (in a right-hand portion of FIG. 3), the valve member 17 is moved in the upstream direction and the downstream-side outer peripheral portion 43b of the valve member 17 is separated from the valve seat 38. Then, not only the fluid flows in the downstream direction through the restricted communication hole 39 but also the fluid goes around the outer periphery of the valve member 17 in the downstream direction. The above condition of the two-stage changeover valve 18 (that is, the condition shown in the right-hand portion of FIG. 3) is referred to as a valve opened condition of the two-stage changeover valve 18.

As above, the valve member 17 is axially movable depending on the fluid pressure in the upstream side of the fluid passage and thereby the passage area of the fluid passage formed in the valve housing 27 is changed. As a result, a flow amount of the fluid is adjusted by the two-stage changeover valve 18.

The structure of the two-stage changeover valve 18 will be further explained.

As explained above, the valve member 17 has the upstream-side outer peripheral portion 43a and the downstream-side outer peripheral portion 43b. In addition, the valve member 17 has a valve surface portion 43c of a conical shape, which has a tapered outer peripheral surface extending from an axial intermediate portion toward the downstream-side outer peripheral portion 43b.

The restricted communication hole 39 is formed at a radial center of the valve member 17, wherein the upstream side and the downstream side of the restricted communication hole 39 are communicated to each other, so that the restricted communication hole 39 works as a restricted passage through which the vaporized fuel flows when the valve member 17 is moved to its valve closed position.

A small-diameter pipe portion 40 is formed in the axial intermediate portion of the valve member 17 and extends in the downstream direction therefrom, so that the restricted communication hole 39 is elongated in the axial direction from the radial center of the valve member 17.

A spring seat 41 is formed at a root of the small-diameter pipe portion 40, so that an upstream-side end of the spring member 36 is seated on the spring seat 41.

A downstream-side axial end of the small-diameter pipe portion 40 is projected in the downstream direction from the downstream-side outer peripheral portion 43b of the valve member 17.

The downstream-side outer peripheral portion 43b of the valve member 17, which is formed in a cylindrical shape extending in the axial direction and has a short axial length, is movably supported by the downstream-side guide wall surface 35 formed at the inner wall of the valve housing 27. The valve member 17 is thereby movable in the axial direction. The downstream-side outer peripheral portion 43b is also referred to as a downstream-side guide portion 43b of a ring shape.

The downstream-side guide wall surface 35 is formed at the inner wall of the valve housing 27 and extends in the upstream direction from the valve seat 38. More exactly, the downstream-side guide wall surface 35 is formed by inner peripheral surfaces of multiple ribs 42 (at least, three ribs) projecting in a radial-inward direction from the inner wall of the valve housing 27. Spaces formed between the respective neighboring ribs 42 in a circumferential direction form a part of the fluid passage, through which the fluid flows when the valve member 17 is moved in the upstream direction and the fluid goes around the outer periphery of the valve member 17, as indicated by arrows in the right-hand portion of FIG. 3.

The upstream-side outer peripheral portion 43a of the valve member 17 is also referred to as an upstream-side guide portion 43a of a ring shape.

In a similar manner to the downstream-side guide portion 43b, the upstream-side guide portion 43a is formed in a cylindrical shape extending in the axial direction and has a short axial length and movably supported by the upstream-side guide wall surface 34 formed at the inner wall of the cylindrical member 28. The valve member 17 is thereby movable in the axial direction.

The upstream-side guide portion 43a is connected to the axial intermediate portion of the valve member 17 by multiple leg portions 44 (for example, four leg portions), so that the upstream-side guide portion 43a and the axial intermediate portion of the valve member 17 move together. Each of the leg portions 44 is inclined from the upstream-side guide portion 43a to the axial intermediate portion of the valve member 17, that is, in the radial inward direction. More exactly, each of the leg portions 44 linearly extends from a downstream-side axial end of the upstream-side guide portion 43a toward an upstream-side axial end of the axial intermediate portion of the valve member 17, in which the restricted communication hole 39 is formed.

The valve member 17 including the downstream-side guide portion 43b, the valve surface portion 43c, the small-diameter pipe portion 40 (including the axial intermediate portion), the upstream-side guide portion 43a and the multiple leg portions 44 is made of resin and integrally formed as one member.

A rubber stopper 45 of a ring shape is attached to a downstream-side axial end of the downstream-side guide portion 43b in order that not only a sealing performance between the valve member 17 and the valve seat 38 is increased but also a noise is suppressed when the valve member 17 is brought into contact with the valve seat 38. In a similar manner to the rubber stopper 45, another rubber stopper 46 is attached to an upstream-side axial end of the upstream-side guide portion 43a.

The rubber stoppers 45 and 46 are attached to the valve member 17 by bonding, adhesion, integral molding or the like. The rubber stoppers 45 and 46 are not always necessarily provided.

The ECU 13 controls an on-off operation of the electromagnetic valve 16, when gasoline is filled into the fuel tank 2. Hereinafter, the on-off operation of the electromagnetic valve 16 by the ECU 13 will be explained.

The ECU 13 includes a pressure-relief function (or a pressure-relief portion), which is realized by a control program, a sequence circuit or the like, in order to introduce the vaporized fuel from the fuel tank 2 into the canister 3 and to thereby prevent the vaporized fuel from being discharged into the atmosphere when a process for filling the gasoline into the fuel tank 2 is prepared or when the gasoline is actually being filled into the fuel tank 2.

A lid switch (not shown) is provided in a compartment of a vehicle, so that the lid switch is operated by a vehicle driver in order to open a fuel lid (not shown).

In addition, an electrically-operated lid-lock device (for example, a solenoid: not shown) is provided in the vehicle in order to prevent the fuel lid from being opened by a spring force.

Furthermore, a lid open sensor (not shown) is provided in the vehicle in order to detect an opened condition of the fuel lid.

The pressure-relief portion of the ECU 13 controls operations of the electromagnetic valve 16 and the lid-lock device based on signals from the lid switch, the pressure sensor 14, the lid open sensor and so on.

More exactly, when the vehicle driver turns on the lid switch in order to fill the gasoline into the fuel tank 2, the ECU 13 turns on the electromagnetic valve 16. Then, the vaporized fuel passage 5, which connects the fuel tank 2 to the canister 3, is opened, so that the vaporized fuel in the fuel tank 2 flows into the canister 3 through the two-stage changeover valve 18. As a result, the in-tank pressure of the fuel tank 2 is decreased.

When the in-tank pressure of the fuel tank 2 detected by the pressure sensor 14 becomes lower than a predetermined value, the ECU 13 temporarily turns on the lid-lock device in order to release a locked condition of the lid-lock device. As a result, the fuel lid is opened and it becomes possible to open a filler cap.

The ECU 13 continues an ON-condition of the electromagnetic valve 16, until the ECU 13 confirms by the lid open sensor that the fuel lid is closed. The vaporized fuel is discharged from the fuel tank 2 in accordance with an increase of liquid level of the gasoline in the fuel tank 2 during the filling process of the gasoline. The vaporized fuel discharged from the fuel tank 2 flows into the canister 3 through the two-stage changeover valve 18. Accordingly, it is possible to prevent the vaporized fuel from being discharged into the atmosphere during the filling process of the gasoline.

When the filler cap is closed after the end of the filling process of the gasoline and when the ECU 13 confirms by the signal from the lid open sensor that the fuel lid is closed, the ECU 13 turns off the electromagnetic valve 16.

(Characterizing Technologies of the Embodiment)

Hereinafter, a time period from a time point when the lid switch is turned on by the vehicle driver to a time point when the locked condition of the lid-lock device is released is referred to as a fuel-charge preparation time.

When the pressure of the vaporized fuel in the fuel tank 2 is higher than a predetermined changeover pressure during the fuel-charge preparation time, the two-stage changeover valve 18 provided in the vaporized fuel passage 5 is moved to the valve closed condition.

The changeover pressure and an inner diameter of the restricted communication hole 39 for the two-stage changeover valve 18 will be explained with reference to FIG. 4.

Figure 4:
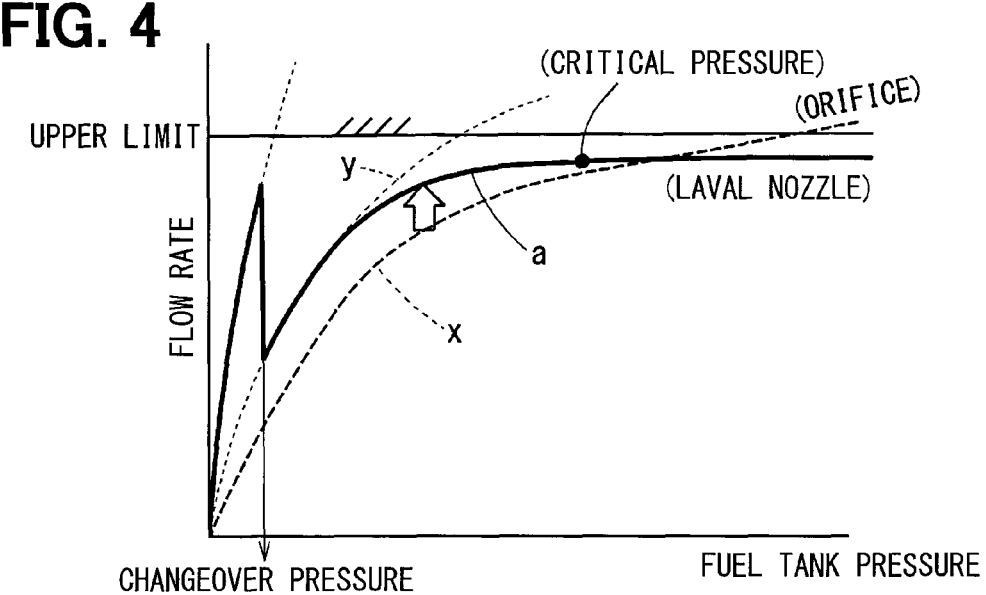
FIG. 4 is a graph showing a P-Q characteristic showing a relationship between an in-tank pressure and a flow rate.

With respect to a supply amount of the vaporized fuel, which is supplied into the canister 3 through the vaporized fuel passage 5, an upper limit for a flow rate is set, as shown in FIG. 4. In other words, the two-stage changeover valve 18 restricts the supply amount (per unit time) of the vaporized fuel to be supplied into the canister 3 through the vaporized fuel passage 5. The upper limit of the supply amount (per unit time) for the vaporized fuel is decided based on, for example, an absorption capacity of the canister 3 or the like. The changeover pressure and the inner diameter of the restricted communication hole 39 for the two-stage changeover valve 18 are so set that the supply amount (per unit time) of the vaporized fuel does not exceed the upper limit thereof.

In a case of the two-stage changeover valve of the prior art (for example, the above-explained JP No. 2005-291241 A), a restricted passage formed in a valve member (corresponding to the restricted communication hole 39 of the present disclosure) has a simple orifice structure. In other words, the restricted passage of the simple orifice structure is formed at a center of a disc-shaped valve member.

In a case that the restricted communication hole 39 of the present embodiment was composed of the orifice (the simple orifice structure), the inner pressure of the vaporized fuel would be depressurized only through the orifice when the two-stage changeover valve 18 is in its valve closed condition, as indicated by a dotted line "x" in FIG. 4. Needless to say, the inner pressure is depressurized when the inner pressure of the vaporized fuel in the fuel tank 2 is higher than the predetermined changeover pressure. Therefore, a depressurizing amount of the vaporized fuel for a unit time is smaller in the valve closed condition, as indicated by a solid line "x1" in FIG. 5B. As a result, the fuel-charge preparation time becomes longer, as indicated by "tx" in FIG. 5B.

It is desirable to reduce the fuel-charge preparation time in view of improving an operational feeling.

It could be possible to increase an inner diameter of the orifice of the above-explained prior art for the purpose of reducing the fuel-charge preparation time. However, when the inner diameter of the orifice is increased, a flow rate of the vaporized fuel passing through the orifice is correspondingly increased and may go beyond the upper limit, as indicated by a dotted line "y" in FIG. 4.

According to the present embodiment, therefore, the restricted communication hole 39 is formed in a Laval-nozzle shape (a shape of a convergent-divergent nozzle) instead of increasing the inner diameter of the restricted communication hole 39, in order to avoid the situation that the flow rate of the vaporized fuel exceeds its upper limit.

The Laval-nozzle shape is known in the art as a nozzle shape, according to which a flow speed of a fluid (which has a high pressure and applied to an upstream side of a nozzle) is increased so as to introduce the fluid to a downstream side of the nozzle (in which the fluid pressure is low). For example, a sonic velocity is changed to a supersonic velocity.

The Laval-nozzle shape is formed at an inner peripheral surface of the small-diameter pipe portion 40, which is integrally formed with the valve member 17.

An example of the Laval-nozzle shape will be explained with reference to FIG. 2B.

The Laval-nozzle shape has the following three dimensions;

a reduced-diameter range "L1" of an upstream side;
a most-reduced portion "D"; and
an enlarged-diameter range "L2" of a downstream side.

The reduced-diameter range "L1" corresponds to an inner wall surface portion for smoothly introducing the fluid having entered the restricted communication hole 39 into the most-reduced portion "D". For example, the inner wall surface of the reduced-diameter range "L1" is formed by a curved surface having a single curvature radius. In other words, the inner wall surface is formed by the curved surface of a convex shape. Accordingly, in the reduced-diameter range "L1", the restricted communication hole 39 has a tubular shape in which the inner wall surface is expanded in a radial-inward direction of the restricted communication hole 39.

Figure 1:
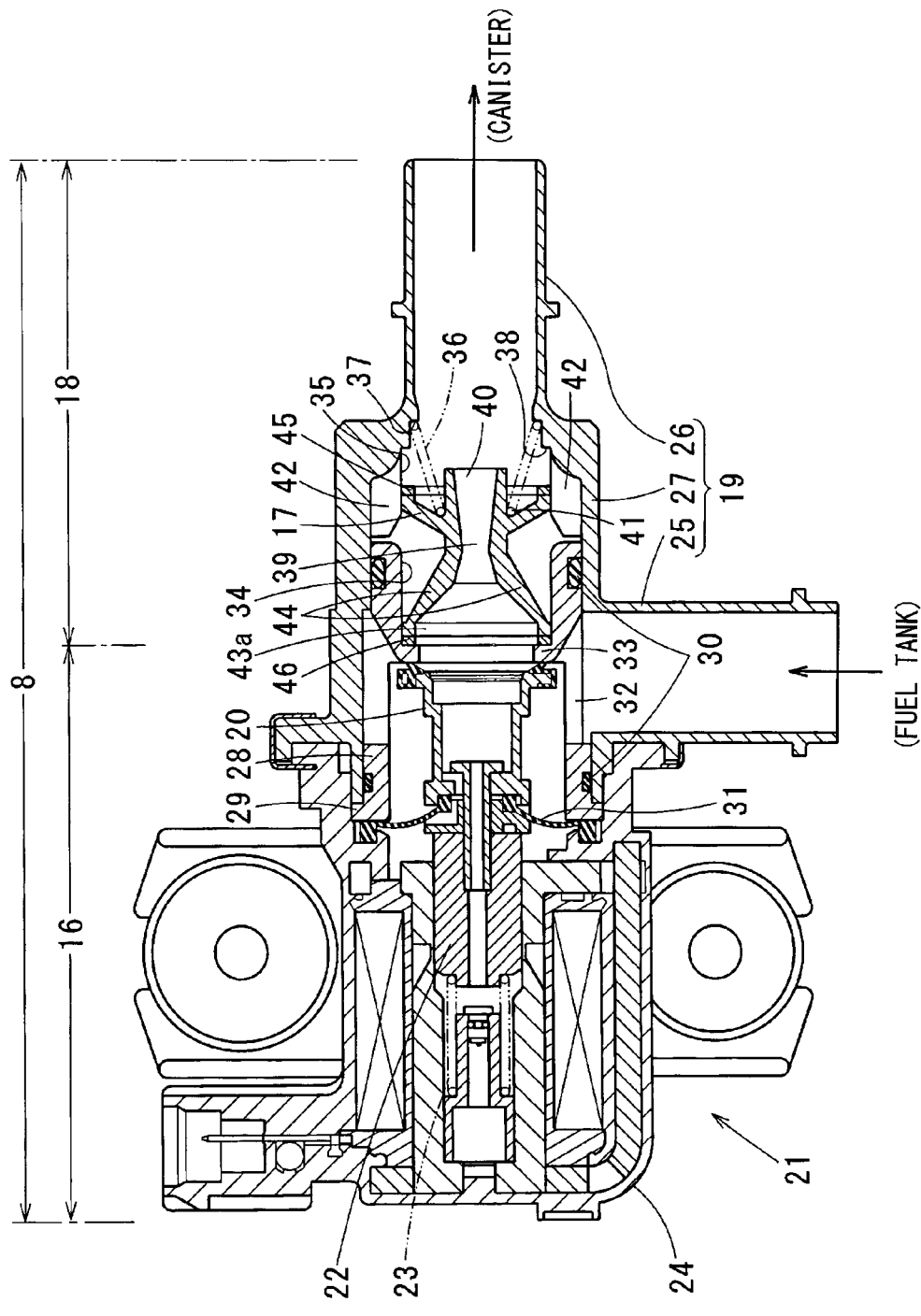
FIG. 1 is a schematic cross sectional view showing a closed-type valve device, in which a two-stage changeover valve and an electromagnetic valve are combined together, according to an embodiment of the present disclosure.

Needless to say, the shape for the reduced-diameter range "L1" is not limited to the shape shown in FIG. 2B. The reduced-diameter range "L1" may be formed by a tapered surface (a straightly extending and inclined surface), a diameter of which is reduced in the downstream direction, as shown in FIG. 1. Alternatively, the tapered surface and the curved surface may be combined together.

The most-reduced portion "D" defines a minimum inner diameter of the restricted communication hole 39. The most-reduced portion "D" is formed by, for example, a gradually curved surface of a convex shape, which is continuously connected to the curved surface of the reduced-diameter range "L1".

The shape of the most-reduced portion "D" is not limited to the shape shown in FIG. 2B. For example, as shown in FIG. 1, the most-reduced portion "D" may be formed by a combination of a tapered surface gradually reduced in the downstream direction and a tapered surface gradually expanded in the downstream direction.

The enlarged-diameter range "L2" corresponds to an inner wall surface portion for smoothly accelerating the speed of the fluid, which is compressed at the most-reduced portion "D". For example, the inner wall surface of the enlarged-diameter range "L2" is formed by a curved surface, from which the fluid may not be separated.

More exactly, the inner wall surface of the enlarged-diameter range "L2" is formed by a combination of an upstream-side curved surface of a convex shape and a downstream-side curved surface of a concave shape. The upstream-side curved surface of the convex shape is continuously connected to the inner wall surface of the most-reduced portion "D", while the downstream-side curved surface of the concave shape is continuously connected to the upstream-side curved surface of the convex shape.

The shape of the enlarged-diameter range "L2" is not limited to the shape shown in FIG. 2B. For example, as shown in FIG. 1, the enlarged-diameter range "L2" may be formed by a tapered surface (a straightly extending and inclined surface), a diameter of which is increased in the downstream direction from the most-reduced portion "D". Alternatively, the enlarged-diameter range "L2" may be formed by a combination of "the curved surface of the convex shape and the curved surface of the concave shape" and "the tapered surface expanded in the downstream direction".

Advantages of the Embodiment (1) In the two-stage changeover valve 18 of the present embodiment, the restricted communication hole 39 is formed in the Laval-nozzle shape.

According to the above structure, it is possible to quickly supply the vaporized fuel into the canister 3 during the process of depressurizing the in-tank pressure of the fuel tank 2, even when the fluid pressure at the upstream side of the restricted communication hole 39 (that is, the pressure of the vaporized fuel in the fuel tank 2) is high and the two-stage changeover valve 18 is moved to its valve closed condition. In the depressurizing process, the vaporized fuel introduced from the fuel tank 2 to the two-stage changeover valve 18 is accelerated in the small-diameter pipe portion 40 of the Laval-nozzle shape, so that the vaporized fuel quickly flows in the downstream direction to the canister 3.

In other words, as a result that the restricted communication hole 39 of the small-diameter pipe portion 40 is formed in the Laval-nozzle shape, a larger amount of the vaporized fuel can be quickly supplied into the canister 3, as indicated by a solid line "a" in FIG. 4, when compared with the case of the prior art (indicated by the dotted line "x" in FIG. 4). Accordingly, it is possible to reduce the fuel-charge preparation time.

Figure 5A:
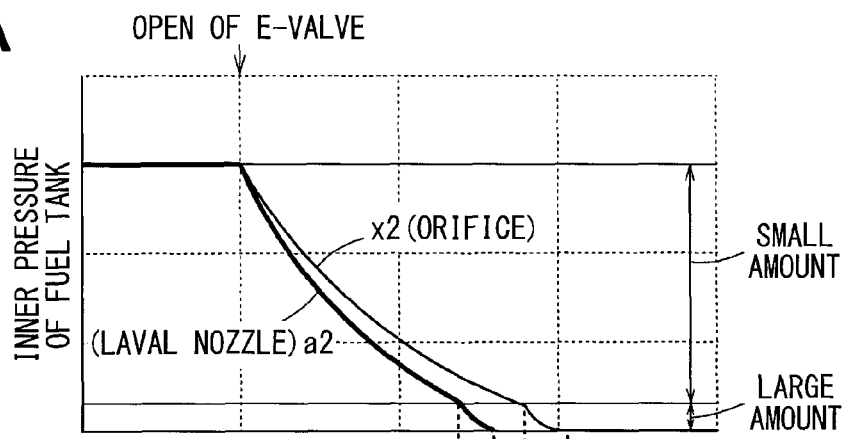
FIG. 5A is a graph showing a depressurizing characteristic showing a relationship between a time path and an in-tank pressure.

The above advantage will be further explained with reference to FIGS. 5A and 5B.

For the purpose of comparison with the prior art, a virtual device is supposed, in which the restricted communication hole 39 is replaced by the orifice having the simple orifice structure. In the virtual device, the vaporized fuel flows through the orifice during a period from a time point when the electromagnetic valve 16 is turned on to a time point when the valve position of the two-stage changeover valve 18 is changed from the valve closed condition to the valve opened condition.

Figure 5B:
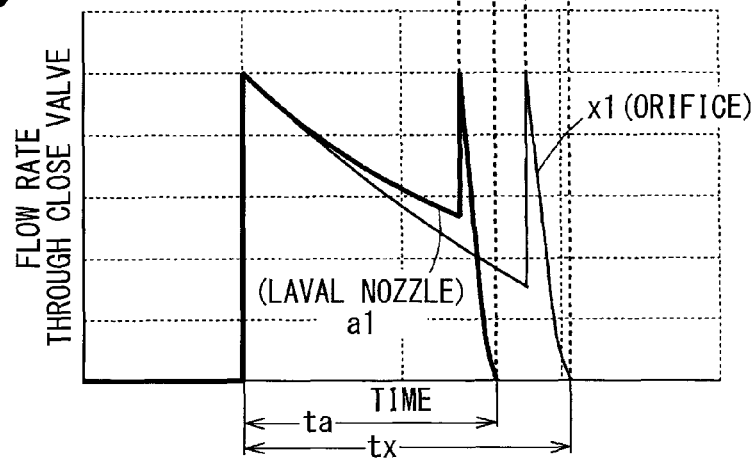
FIG. 5B is a graph showing a depressurizing characteristic showing a relationship between a time path and a flow rate.

In other words, during the period in which the two-stage changeover valve 18 is in its closed condition, the flow rate of the vaporized fuel flowing through the orifice is limited by the orifice, as indicated by the solid line "x1" in FIG. 5B. In such a case, a longer time is necessary until the inner pressure of the vaporized fuel is decreased in the fuel tank 2, as indicated by a solid line "x2" in FIG. 5A. In other words, the fuel-charge preparation time "tx" becomes longer.

On the other hand, according to the present embodiment, the restricted communication hole 39 is formed in the Laval-nozzle shape. The vaporized fuel flows through the restricted communication hole 39 (the Laval-nozzle shape) during the period from the time point when the electromagnetic valve 16 is turned on to the time point when the valve position of the two-stage changeover valve 18 is changed from the valve closed condition to the valve opened condition.

When the vaporized fuel passes through the restricted communication hole 39, the vaporized fuel is accelerated by the Laval-nozzle shape. As a result, the flow rate of the vaporized fuel flowing through the closed-type valve device 8 is increased when the two-stage changeover valve 18 is in its valve closed condition, as indicated by a solid line "a1" in FIG. 5B. Accordingly, the speed of the process for depressurizing the inner pressure of the vaporized fuel in the fuel tank 2 is increased, as indicated by a solid line "a2" in FIG. 5A. Thus, the fuel-charge preparation time "ta" becomes shorter.

(2) In the two-stage changeover valve 18 of the present embodiment, the restricted communication hole 39 is formed in the Laval-nozzle shape.

According to the above structure (the Laval-nozzle shape), a critical pressure is produced in the restricted communication hole 39 when the inner pressure of the vaporized fuel in the fuel tank 2 is high, as shown in FIG. 4. It is, therefore, possible to limit a maximum flow rate of the vaporized fuel for a unit time by the critical pressure.

In other words, the flow rate of the vaporized fuel may exceed the predetermined upper limit, as indicated by the dotted line "x" in FIG. 4, in the case that the orifice (having the simple orifice structure) is formed in the restricted communication hole 39 instead of the Laval-nozzle shape.

On the other hand, in the present embodiment, the Laval-nozzle shape is formed in the restricted communication hole 39. Since the maximum flow rate can be limited by the critical pressure, it is possible to avoid the situation that the flow rate exceeds the predetermined upper limit even when the inner pressure of the fuel tank 2 is high, as indicated by the solid line "a" in FIG. 4.

(3) In the valve member 17 of the present embodiment, a downstream-side portion (the valve surface portion 43c) is formed in the conical shape. In other words, the outer peripheral surface of the downstream-side portion is tapered in the downstream direction. More exactly, the outer peripheral surface is expanded in the downstream direction.

When the two-stage changeover valve 18 is moved to its valve opened condition, namely when the valve member 17 is moved in the upstream direction, the fluid (the vaporized fuel) bypassing the valve member 17 flows along the outer peripheral surface, which is tapered and inclined in the axial direction of the restricted communication hole 39. In other words, the outer peripheral surface of the downstream-side portion of the valve member 17 forms the conical shape and comes closer to a streamlined shape. Accordingly, it is possible to reduce an airflow resistance of the fluid bypassing the valve member 17.

(4) The small-diameter pipe portion 40 also works as the spring seat 41 for the spring member 36.

An outer diameter of the small-diameter pipe portion 40 is decided as such dimension, that the spring member 36 is not easily detached from the small-diameter pipe portion 40. As a result, a process for assembling the spring member 36 can be improved.

In addition, since the small-diameter pipe portion 40 works as the spring seat 41, it is possible to surely bring the spring member 36 into contact with the valve member 17 at a proper position. It is, therefore, possible to increase spring accuracy.

(5) In the present embodiment, the small-diameter pipe portion 40 extends in the axial direction of the valve member 17, so that the downstream-side end of the small-diameter pipe portion 40 is projected in the downstream direction from the downstream-side outer peripheral portion 43b.

According to such a structure, it is possible to avoid a situation that the fluid (the vaporized fuel) having passed through the restricted communication hole 39 is sucked into a space between an outer periphery of the pipe portion 40 and an inner periphery of the downstream-side end (43b) of the valve member 17. As a result, it is possible to stabilize the flow rate of the vaporized fuel passing through the restricted communication hole 39.

(6) In the present embodiment, the two-stage changeover valve 18 and the electromagnetic valve 16 are combined so as to form the closed-type valve device 8.

More exactly, the closed-type valve device 8 (having the valves 18 and 16 combined together) is provided in the vaporized fuel passage 5 connected between the fuel tank 2 and the canister 3.

According to the above structure, some of the parts and/or the components for the two-stage changeover valve 18 and the electromagnetic valve 16 are commonly used in the closed-type valve device 8, to thereby reduce a number of parts and components as well as connecting portions of pipes between the components for the two-stage changeover valve 18 and the electromagnetic valve 16.

Further Modifications (M1) In the above embodiment, the small-diameter pipe portion 40 is integrally formed with the valve member 17. The small-diameter pipe portion 40 having the Laval-nozzle shape may be formed as in independent member from the valve member 17 and connected thereto.

(M2) In the above embodiment, the valve member 17 has two ring-shaped sliding portions, that is, the upstream-side guide portion 43a and the downstream-side guide portion 43b. The valve member 17 is movably supported in the valve housing 27 (the accommodating pipe portion 27) by the guide portions 43a and 43b. However, the supporting structure for the valve member 17 is not limited to the structure shown in the drawings.

(M3) In the above embodiment, the two-stage changeover valve 18 and the electromagnetic valve 16 are integrally formed with each other. However, the two-stage changeover valve 18 and the electromagnetic valve 16 may be separately formed from each other.

(M4) In the above embodiment, the two-stage changeover valve 18 is applied to the fuel purging apparatus for the vaporized fuel. However, the two-stage changeover valve may be used for any other apparatuses or devices.

(M5) In the above embodiment, the valve position of the two-stage changeover valve 18 is automatically changed depending on the fluid pressure at the upstream side (that is, the pressure of the vaporized fuel from the fuel tank 2). In other words, the two-stage changeover valve 18 is composed of the pressure-responsive valve. However, the two-stage changeover valve may be composed of an electrically-operated valve, in which the valve position is changed by an electric actuator (for example, a solenoid).

What is claimed is:

1. A two-stage changeover valve comprising:
    a valve member movably provided in a fluid passage; and
    a restricted communication hole formed in the valve member and extending in an axial direction of the valve member so that an upstream side and a downstream side of the restricted communication hole are communicated with each other,
    wherein fluid is allowed to flow only through the restricted communication hole, when the valve member is seated on a valve seat formed in an inner wall of the fluid passage, and
    wherein the restricted communication hole is formed in a Laval-nozzle shape, so that the fluid passing through the restricted communication hole is accelerated.

2. The two-stage changeover valve according to claim 1, further comprising;
    a spring member for biasing the valve member in an upstream direction of the fluid passage,
    wherein the valve member receives pressure of the fluid at an upstream side of the valve member in a downstream direction of the fluid passage,
    wherein the valve member is moved in the downstream direction against a spring force of the spring member in order to close the fluid passage when the pressure of the fluid at the upstream side is increased, so that the fluid flows in the downstream direction only through the restricted communication hole, and
    wherein the valve member is moved in the upstream direction by the spring force of the spring member in order to open the fluid passage when the pressure of the fluid at the upstream side is decreased.

3. The two-stage changeover valve according to claim 1, wherein
    a small-diameter pipe portion is integrally formed with the valve member and extending in the axial direction of the valve member,
    the small-diameter portion extends from a center of the valve member in the downstream direction, and
    an inner peripheral surface of the small-diameter pipe portion is formed in the Laval-nozzle shape.

4. The two-stage changeover valve according to claim 1, further comprising;
    an electromagnetic valve provided in the fluid passage at the upstream side of the valve member for opening or closing the fluid passage.

5. The two-stage changeover valve according to claim 1, wherein
    the two-stage changeover valve is provided in the fluid passage, through which pressure of a tank is depressurized.

6. The two-stage changeover valve according to claim 5, wherein
    the fluid passage is connected between a fuel tank of a vehicle and a canister, and
    the two-stage changeover valve is provided in the fluid passage in order to depressurize pressure of vaporized fuel in the fuel tank.

7. A two-stage changeover valve to be applied to a fuel purging system for a vehicle, comprising;
    a valve housing to be provided in a vaporized fuel passage connecting a fuel tank to a canister;
    a valve member movably accommodated in the valve housing, so that the valve member is movable in a fluid passage formed in the valve housing;
    a restricted communication hole formed in the valve member and extending in an axial direction of the valve member so that an upstream side and a downstream side of the restricted communication hole are communicated with each other;
    a valve seat formed at an inner peripheral wall of the valve housing, so that the fluid passage is closed when the valve member is seated on the valve seat; and
    a spring member provided in the valve housing for biasing the valve member in an upstream direction of the fluid passage,
    wherein vaporized fuel is allowed to flow from the fuel tank into the canister only through the restricted communication hole, when the valve member is seated on the valve seat, and
    wherein the restricted communication hole is formed in a Laval-nozzle shape, so that the vaporized fuel passing through the restricted communication hole is accelerated.

* * * * *